UNITED STATES PATENT OFFICE.

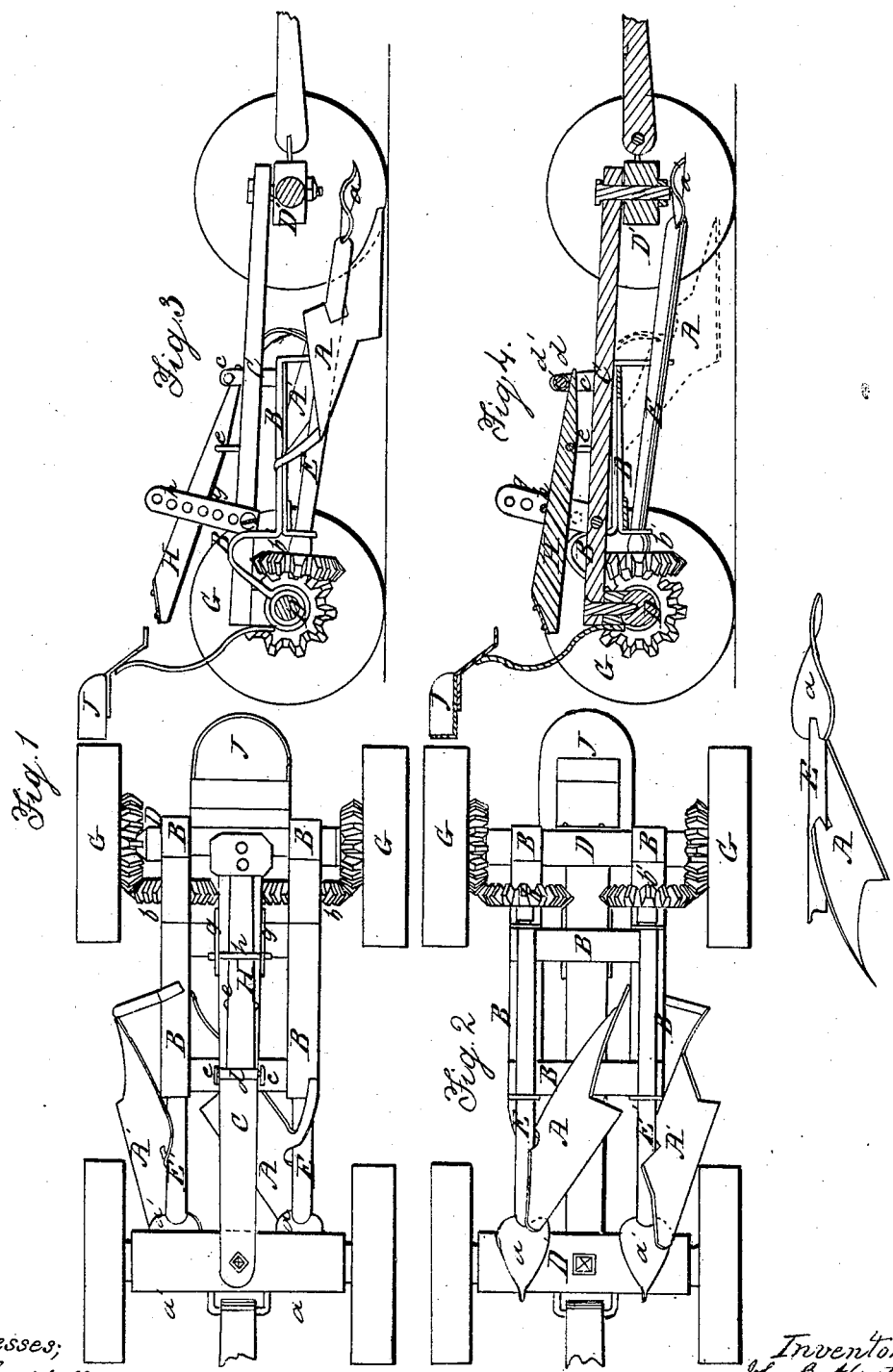

JOHN B. ATWATER, OF CHICAGO, ILLINOIS.

IMPROVEMENT IN PLOWS.

Specification forming part of Letters Patent No. 46,768, dated March 14, 1865.

*To all whom it may concern:*

Be it known that I, JOHN B. ATWATER, of Chicago, Cook county, State of Illinois, have invented a new and Improved Gang-Plow; and I do hereby declare that the following is a full, clear, and exact description thereof, reference being had to the accompanying drawings, making a part of this specification, in which—

Figure 1 is a plan view of my plow. Fig. 2 is a bottom view. Fig. 3 is a side elevation with the two wheels removed. Fig. 4 is a vertical longitudinal section through the center of the plow.

Similar letters of reference indicate corresponding parts in the several figures.

This invention relates particularly to that class of plows which are supported upon transporting-wheels, and arranged to work in gangs for turning two or more slices at the same time.

The nature of my invention consists in combining with ordinary turn-plows revolving augers for stirring and breaking up the earth preparatory to its being turned over by the plows, said plows and augers being sustained by a vibrating frame, which can be adjusted at the pleasure of the attendant while riding upon the machine, so as to elevate or depress the points of the plows and augers according to the depth which it is desired to run them, as will be hereinafter described.

To enable others skilled in the art to make and use my invention, I will describe its construction and operation.

The machine which I have represented in the accompanying drawings has two plows, A A', applied to it, which may be made of any suitable form for turning the sod. These plows are secured rigidly to a frame, B, which is located beneath a central longitudinal beam, C, that extends from the rear axle, D, to the front axle, D', as shown in the drawings. Frame D is made very strong, and its rear ends are connected to the rear axle, D, in such manner that its forward end can be elevated or depressed. The mode of connecting said frame to its axle is shown in Fig. 3.

Directly above the plows A A', and in a line with their points, are two inclined shafts, E E', which have their bearings in the frame B, and are moved with this frame. These shafts carry on their forward ends auger-points $a\ a'$, which project beyond the points of their respective plows and loosen the earth preparatory to turning the sod. The rear ends of said shafts have beveled spur-wheels $b\ b'$ keyed on them, which engage with the teeth of beveled spur-wheels that are secured to the inside surfaces of the rear transporting-wheels, G G, as shown in the several figures of the accompanying drawings. The wheels G G turn loosely on their axle D, and when the machine is propelled forward these wheels serve as drivers for giving a rapid rotary motion to both of the auger-shafts E E', in whatever position their supporting-frame B may be arranged.

Frame B has two standards projecting up from it, as shown at $c\ c$, Figs. 1, 3, and 4, which are connected together at their upper ends by a horizontal transverse pin, $d$, surrounding which is a friction-roller, $d'$. The beam C passes between standards $c\ c$ and beneath its pin $d$, and serves as a means for sustaining the forward part of the frame B against lateral thrust.

H represents a lever which has it fulcrum at $e$, upon the longitudinal beam C, and which extends forward, so as to receive upon its front end the stirrup $c\ c\ d$ of the frame B, and to support this frame the rear arm of the lever H extends back to a convenient point for the driver to press upon it with his feet while sitting upon the seat J. Standards $g\ g$ project up from the sides of beam C, on each side of the lever H, and receive through them a pin, $h$, which extends across the top of the rear arm of lever H, and prevents this arm from rising and the front end of frame B from dropping down. Several holes for pin $h$ are made through the standards $g\ g$ for sustaining the frame B at different heights.

By the arrangement which I have above described the downward pressure on the plows and augers is sustained by the short arm of the lever or treadle H, the rear end or long arm of which is held down by the adjustable pin $h$. By depressing the rear arm of lever H the driver can elevate the augers and cause them to run deeper or shallower in the ground; or he can elevate them above the ground for avoiding obstructions or for transporting the machine from one place to another.

The augers consist of tapering blades twisted in a spiral form, so as to enter the sod freely and loosen a passage for the plows, which immediately follow and turn over the earth thus loosened.

In carrying out my invention it is important to have the augers arranged in a line with the points of their respective plows, and also arranged on the landside of each plow. For this purpose I have notched the shafts of the augers into the mold-boards of the plows and extended frame B, at its rear extremeties, over the bevel-wheels $b\ b'$, in the form of arches, as represented in Figs. 1 and 3.

I do not desire to limit myself to the use of auger-points constructed as represented in the drawings, as a variety of forms may be employed which will answer the desired end herein set forth.

What I claim as new, and desire to secure by Letters Patent, is—

1. The combination of one or more rotating augers with one or more turn-plows and an adjustable swinging frame, B, substantially as described.

2. The employment of rotating augers upon a frame, B, that carries the plows A A', and which is hinged at its rear arched ends to the rear supporting-axle, D, and suspended near its front end from the beam C, substantially as described.

3. Arranging the augers in a line with and over the points of the plows, when both augers and plows are sustained beneath and by a vibrating frame, substantially as described.

JOHN B. ATWATER.

Witnesses:
   E. HURD,
   G. TRUMBULL.